O. KATZENBERGER.
FLOOR SPRING HINGE.
APPLICATION FILED OCT. 29, 1912.

1,063,128.

Patented May 27, 1913.

WITNESSES
Geo. W. Naylor
A. L. Kitchin

INVENTOR
OSCAR KATZENBERGER,
BY Munn & Co.
ATTORNEYS

COLUMBIA PLANOGRAPH CO., WASHINGTON, D. C.

UNITED STATES PATENT OFFICE.

OSCAR KATZENBERGER, OF CHICAGO, ILLINOIS.

FLOOR SPRING-HINGE.

1,063,128.                Specification of Letters Patent.       Patented May 27, 1913.

Application filed October 29, 1912. Serial No. 728,356.

*To all whom it may concern:*

Be it known that I, OSCAR KATZENBERGER, a citizen of the United States, and a resident of Chicago, in the county of Cook and State of Illinois, have invented a new and Improved Floor Spring-Hinge, of which the following is a full, clear, and exact description.

The object of the invention is to provide in a spring hinge of the class mentioned, a cam and co-acting roller structure formed with roller sleeves at the ends arranged in guiding slots whereby the hinge operates with a minimum friction, while retaining the body of the hinge in proper position.

A further object of the invention is to provide in a floor spring hinge an arrangement of oil cups or housings for supporting oil adjacent the various moving parts.

In carrying out the objects of the invention, a supporting frame is provided in which a spring-pressed reciprocating bar is provided designed to press against a roller bearing structure guided in suitable slots in the frame. This roller bearing structure is associated with a cam extending at right angles to the direction of the door to which the hinge is secured when in a closed position. The cam structure is rigidly secured to a floor plate and when arranged in place is held immovable while the door and remaining part of the hinge is adapted to swing to either side thereof. Surrounding the cam, the roller bearing, and other moving parts, is a housing formed of a pair of members designed to inclose the various parts without contacting therewith so as to hold a comparatively stiff lubricant adjacent the cam and associated parts, and also to prevent the entrance of dust and other foreign matter.

A practical embodiment of the invention is represented in the accompanying drawings forming a part of this specification, in which similar characters of reference indicate corresponding parts in all the views.

Figure 1:
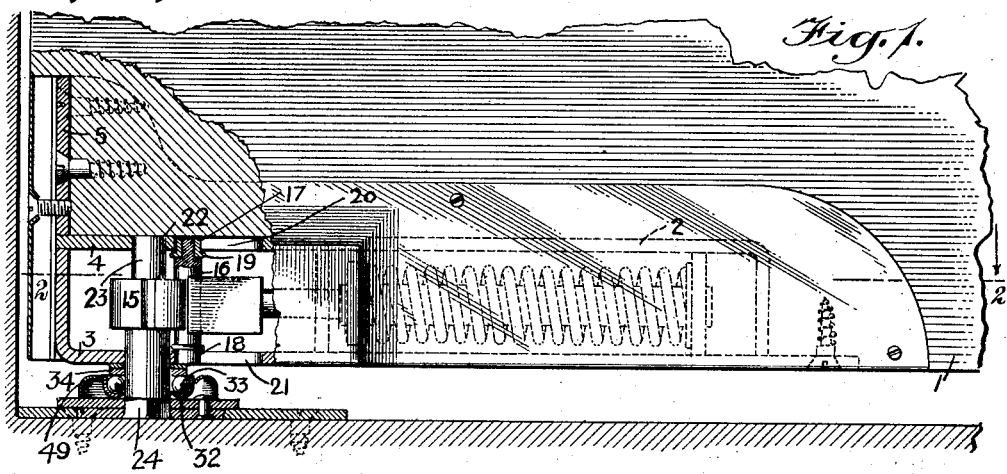
Figure 2:
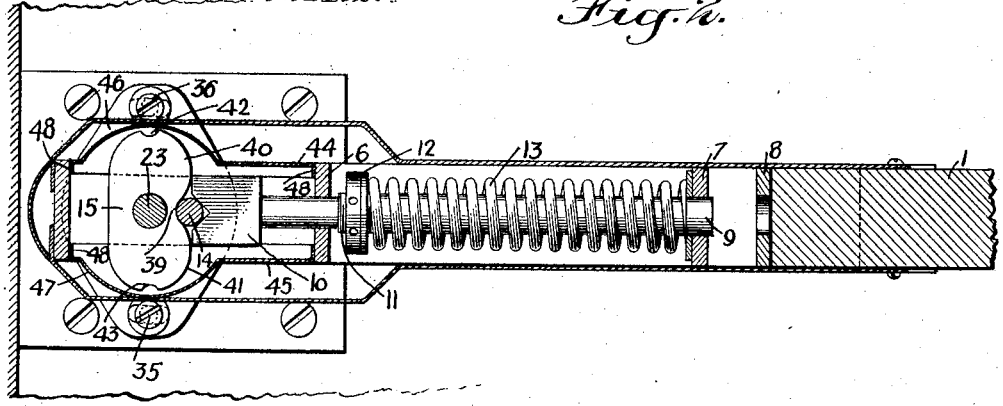
Figure 3:
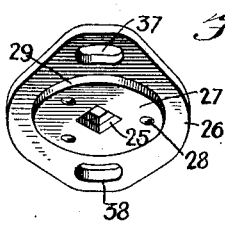
Figure 4:
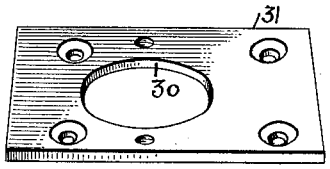

Figure 1 is a side view of an embodiment of the invention shown applied to a door, certain parts being broken away for better illustrating the moving parts; Fig. 2 is a section through Fig. 1 approximately on the line 2—2; Fig. 3 is an inverted detail perspective view of an alining plate; and Fig. 4 is a detail perspective view of a floor plate.

Referring to the accompanying drawings by numerals, 1 indicates a door of any desired structure designed to swing in either of two directions. Secured to the door 1 at one corner thereof is a frame 2 formed with bars 3 and 4, the bar 3 being bent up at the end for forming an extension 5 which is secured by screws or other suitable means to the door 1. A plurality of spacing blocks 6, 7, and 8 are provided in the frame 2 for accommodating a reciprocating rod 9 which is provided with a notched bearing head 10. The rod 9 is provided with a threaded portion 11 for receiving nut 12, which nut is adapted to regulate the tension of the spring 13 arranged between nut 12 and the block 7. By this construction and arrangement the spring 13 is designed to press to any desired degree against block 7, which transmits the strain through frame 2 to the door 1 and against nut 12 which transmits the strain to head 10 and from thence through the roller bearing 14 to the stationary cam 15. The roller bearing 14 is provided with a central portion 16 of solid material formed with shoulders at each end for accommodating the sleeves or tubular bearing members 17 and 18. Each of these sleeves is provided with a flange 19 for preventing the same from accidentally passing either of the slots 20 or 21 formed in the bars 3 and 4 respectively.

The bar 4 is provided with an aperture 22 in which the shaft 23 is loosely mounted. The shaft 23 is rigidly secured to cam 15 and preferably made enlarged at the lower part and also secured at 24 so as to properly fit the squared aperture 25 (Fig. 3) in the alining plate 26. The alining plate 26 is provided with an extension 27 held in place by suitable rivets 28 and is formed with a beveled peripheral edge 29 so as to fit in the beveled aperture 30 of the floor plate 31. In order to support the door properly and to reduce the friction to a minimum, a cup 32 is provided which preferably loosely surrounds the lower part of shaft 23. This cup is adapted to receive balls 33 against which bears a bearing plate or cone structure 34 surrounding the lower part of shaft 23 and supporting the frame 2 together with the door 1. If desired, one or more washers could be used between plate 34 and frame 2.

In operation when it is desired to apply the hinge, the frame 2 and associated parts are separated from the floor plate 31 and secured to the door 1 independent of the floor plate 31. The floor plate 31 is then placed on the floor with one edge against the wall or jamb of the door and secured in position by suitable securing means as screws so that the center of the opening therein will be on the line designed to be occupied by the door. The door is then placed in position with the extension 27 fitting into the aperture in the plate 31. After the door has been properly alined, screws 35 and 36 are passed through slots 37 and 38 and then screwed down tight so as to press the beveled peripheral edge 29 against the edge of aperture 30 and thus bind the shaft 23 and cam 15 rigidly in place. After this has been done the hinge is properly located so that when the door 1 is pushed to one side the spring 13 may cause the head 10 to act on the roller bearing 14 for resisting the opening of the door and for bringing the door back to its original position, the roller 14 being caused to move properly by cam 15. The cam 15 is provided with a central reduced portion 39 in which roller 14 rests when the door is in its normal closed position. From this position the roller 14 is caused to pass over bulged portions or cams 40 and 41 until it enters either notch 42 or notch 43. When the roller 14 enters either of the notches just mentioned the door 1 is locked at right angles to its normal closed position.

In order to cause a proper smooth action of the various parts, and a minimum amount of wear, the cam 15, roller 14, and associated parts are supplied with a lubricant, preferably a heavy lubricant, as for instance vaseline. In order to hold this lubricant properly in place and also to protect or rather prevent the entrance of dust, dirt, and the like, a pair of caps or covers 44 and 45 are provided, formed with bowed out portions 46 and 47 so as to properly fit over the ends of cam 15. The ends of members 44 and 45 are bent in at 48 so as to fit into the space between the turned up portion 5 and block 6. Preferably the members 44 and 45 are made slightly longer than the space between the extension 5 and the block 6 so that there will be a slight tension between the turned in flanges 48 and members 5 and 6.

In addition to the above protecting means, a protecting and resilient dust cap 49 is provided for the ball race or cup 32 so as to give a neat pleasing appearance at this point. This dust cap or covering may be arranged flush with the top of the cup 32 in order to permit the ready insertion of oil, or may be caused to overlap the same if desired, without departing from the spirit of the invention.

Having thus described my invention I claim as new and desire to secure by Letters Patent:—

1. In a hinge of the class described, a frame adapted to be secured to a door, a stationary cam arranged in said frame, said frame being adapted to pivot around said stationary cam, said frame being formed with alined slots, a roller adapted to press against said cam, the ends of said roller being adapted to fit into said slots, antifriction means surrounding the ends of said rollers fitting into said slots, a reciprocating member pressing against said roller and designed to cause the same to press against said cam, and a spring-pressing against one end of said frame and against said reciprocating member.

2. In a hinge of the class described, a framework adapted to be secured to a door, a stationary cam arranged in said framework and extending substantially at right angles thereto beyond the sides thereof, movable means connected with said framework for causing the same to normally remain in a certain position acting on said cam, and a lubricant-retaining housing formed of a pair of side plates having bulged portions for inclosing said cam and associated parts.

3. In a hinge of the class described, a frame adapted to be secured to a door, a cam arranged in said frame formed so as to project on each side thereof, means for securing said cam in place and holding the same stationary in respect to said frame, a roller bearing adapted to press against said cam, a reciprocating member adapted to press against said roller bearing, a spring adapted to act against said frame for pressing the reciprocating member against said roller bearing, and a pair of oil retaining covering members, said covering members being formed with flanges of resilient material adapted to press against said frame for resiliently clamping the covering members in place.

In testimony whereof I have signed my name to this specification in the presence of two subscribing witnesses.

OSCAR KATZENBERGER.

Witnesses:
JOHN CONNOLLY,
OLGA LUND.